(12) United States Patent
Bowers et al.

(10) Patent No.: US 10,014,629 B1
(45) Date of Patent: Jul. 3, 2018

(54) ELECTRO-MECHANICAL LOCKING MECHANISM

(71) Applicant: Microsoft Technology Licensing, LLC, Redmond, WA (US)

(72) Inventors: Scott D. Bowers, Woodinville, WA (US); Joseph B. Gault, Seattle, WA (US); Ivan McCracken, Bellevue, WA (US); Andrew W. Hill, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/448,312

(22) Filed: Mar. 2, 2017

(51) Int. Cl.

| H01R 13/623 | (2006.01) |
|---|---|
| H01R 13/635 | (2006.01) |
| E05B 65/00 | (2006.01) |
| E05B 47/00 | (2006.01) |
| H01R 13/631 | (2006.01) |
| H01R 13/70 | (2006.01) |
| H01R 13/50 | (2006.01) |

(52) U.S. Cl.
CPC ....... *H01R 13/635* (2013.01); *E05B 47/0009* (2013.01); *E05B 65/0067* (2013.01); *H01R 13/50* (2013.01); *H01R 13/631* (2013.01); *H01R 13/70* (2013.01); *H01R 2201/06* (2013.01)

(58) Field of Classification Search
CPC .. H01R 13/635; H01R 2201/06; H01R 13/70; H01R 13/50; H01R 13/631; E05B 65/0067; E05B 47/0009; G06F 1/203; G06F 1/615; G06F 1/1616

USPC .......................................................... 439/153
See application file for complete search history.

(56) References Cited

U.S. PATENT DOCUMENTS

| 5,424,913 A | * | 6/1995 | Swindler | G06F 1/203 |
| | | | | 361/679.47 |
| 6,026,888 A | * | 2/2000 | Moore | F28D 15/02 |
| | | | | 165/104.33 |
| 6,226,177 B1 | | 5/2001 | Rude et al. | |
| 6,243,261 B1 | * | 6/2001 | Janik | G06F 1/1615 |
| | | | | 361/679.46 |

(Continued)

OTHER PUBLICATIONS

Purcher, Jack, "Finally! Apple Reveals their Hybrid Notebook Tablet Details", http://www.patentlyapple.com/patently-apple/2013/04/finally-apple-reveals-their-hybrid-notebook-tablet-details.html, Published on: Apr. 4, 2013, 7 pages.

*Primary Examiner* — Jean F Duverne
(74) *Attorney, Agent, or Firm* — Holzer Patel Drennan

(57) ABSTRACT

The described technology includes a connecting apparatus for a computing device including a connector protrusion attached to an input component and a receptor formed in a receiving component of the computing device and configured to attach to the connector protrusion. The connector protrusion includes a center section having a plurality of electrical connectors configured within a plastic overmold and configured to be communicatively coupled to the computing device to communicate the generated signals and two end sections having mechanical support components configured to be physically coupled to the computing device wherein each of the two end sections are contiguous to the center section. The receptor includes a locking mechanism configured to releasably attach to the connector protrusion.

19 Claims, 12 Drawing Sheets

(56) References Cited

U.S. PATENT DOCUMENTS

| | | | | |
|---|---|---|---|---|
| 6,297,956 B1* | 10/2001 | Janik | ................. | G06F 1/1615 |
| | | | | 361/679.47 |
| 6,377,454 B1* | 4/2002 | Inoue | ................. | G06F 1/203 |
| | | | | 165/80.4 |
| 6,914,197 B2 | 7/2005 | Doherty et al. | | |
| 7,182,634 B2 | 2/2007 | Tran | | |
| 7,404,720 B1 | 7/2008 | Frey et al. | | |
| 7,907,397 B2* | 3/2011 | Hung | ................. | G06F 1/1616 |
| | | | | 165/104.33 |
| 7,909,624 B2 | 3/2011 | Iida | | |
| 8,963,666 B2 | 2/2015 | Bilbrey et al. | | |
| 9,158,384 B2 | 10/2015 | Whit et al. | | |
| 9,244,496 B2 | 1/2016 | Sharma et al. | | |
| 9,385,449 B2 | 7/2016 | Peters et al. | | |
| 9,400,895 B2 | 7/2016 | Dadu et al. | | |
| 9,639,126 B2* | 5/2017 | Senyk | ................. | G06F 1/203 |
| 2008/0166905 A1 | 7/2008 | Murphy et al. | | |
| 2013/0071638 A1* | 3/2013 | Luo | ................. | C08K 3/0033 |
| | | | | 428/212 |
| 2013/0189856 A1 | 7/2013 | Ko et al. | | |

\* cited by examiner

ELECTRO-MECHANICAL LOCKING MECHANISM

BACKGROUND

Electronic devices may include hardware interfaces in the form of electrical connectors for exchanging electrical power, signals, information, or a ground reference. Furthermore, electronic devices including an image display component such as a screen and a main body may also include mechanical support mechanism to attach and/or support the image display component.

SUMMARY

The described technology includes a connecting apparatus for a computing device including a connector protrusion attached to an input component and a receptor formed in a receiving component of the computing device and configured to attach to the connector protrusion. The connector protrusion includes a center section having a plurality of electrical connectors configured within a plastic overmold and configured to be communicatively coupled to the computing device to communicate the generated signals and two end sections having mechanical support components configured to be physically coupled to the computing device wherein each of the two end sections are contiguous to the center section. The receptor includes a locking mechanism configured to releasably attach to the connector protrusion.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

A further understanding of the nature and advantages of the present technology may be realized by reference to the figures, which are described in the remaining portion of the specification. In the figures, like reference numerals are used throughout several figures to refer to similar components.

Figure 3:
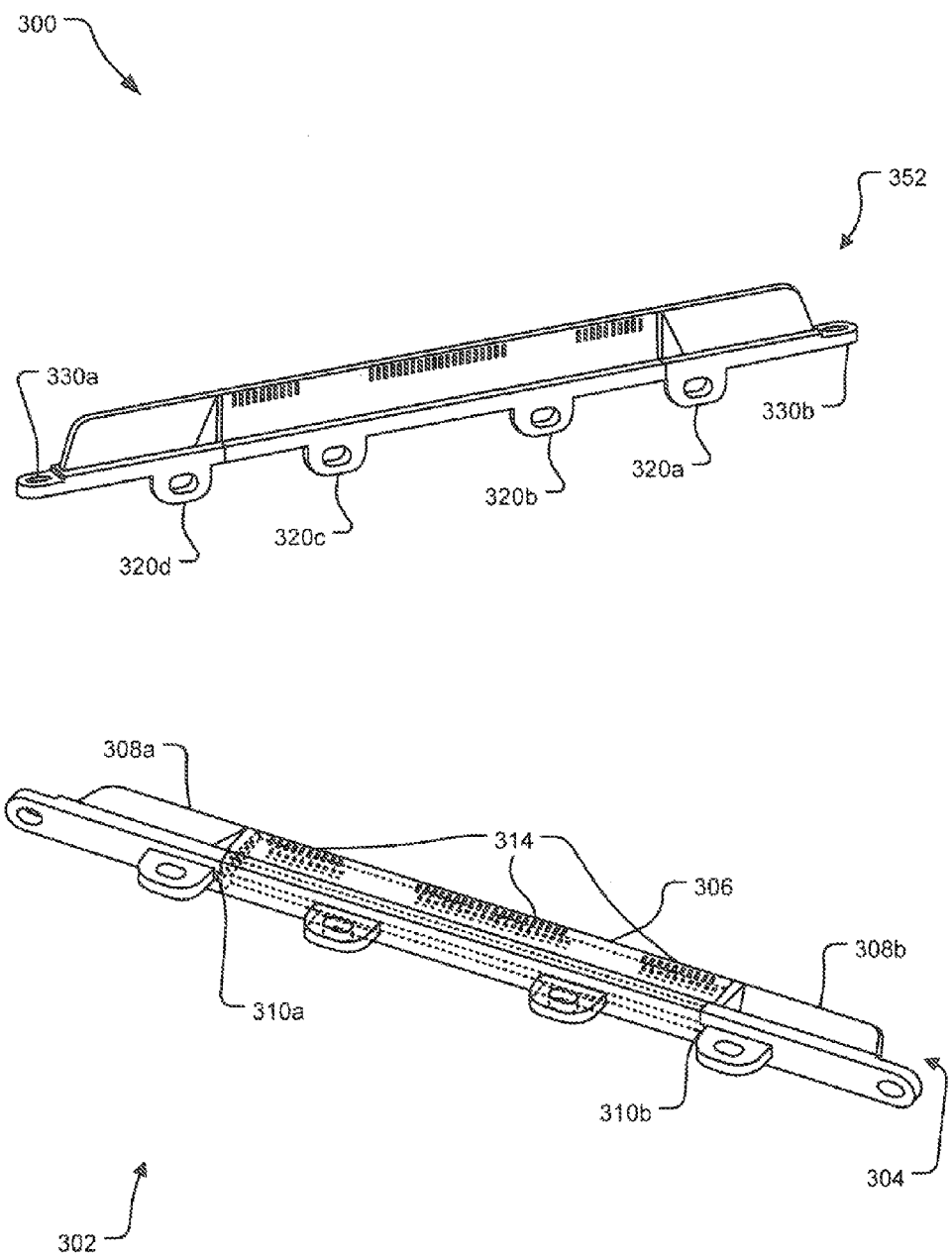

FIG. 3 discloses alternative illustrations of the electro-mechanical locking mechanism disclosed herein.

Figure 4:
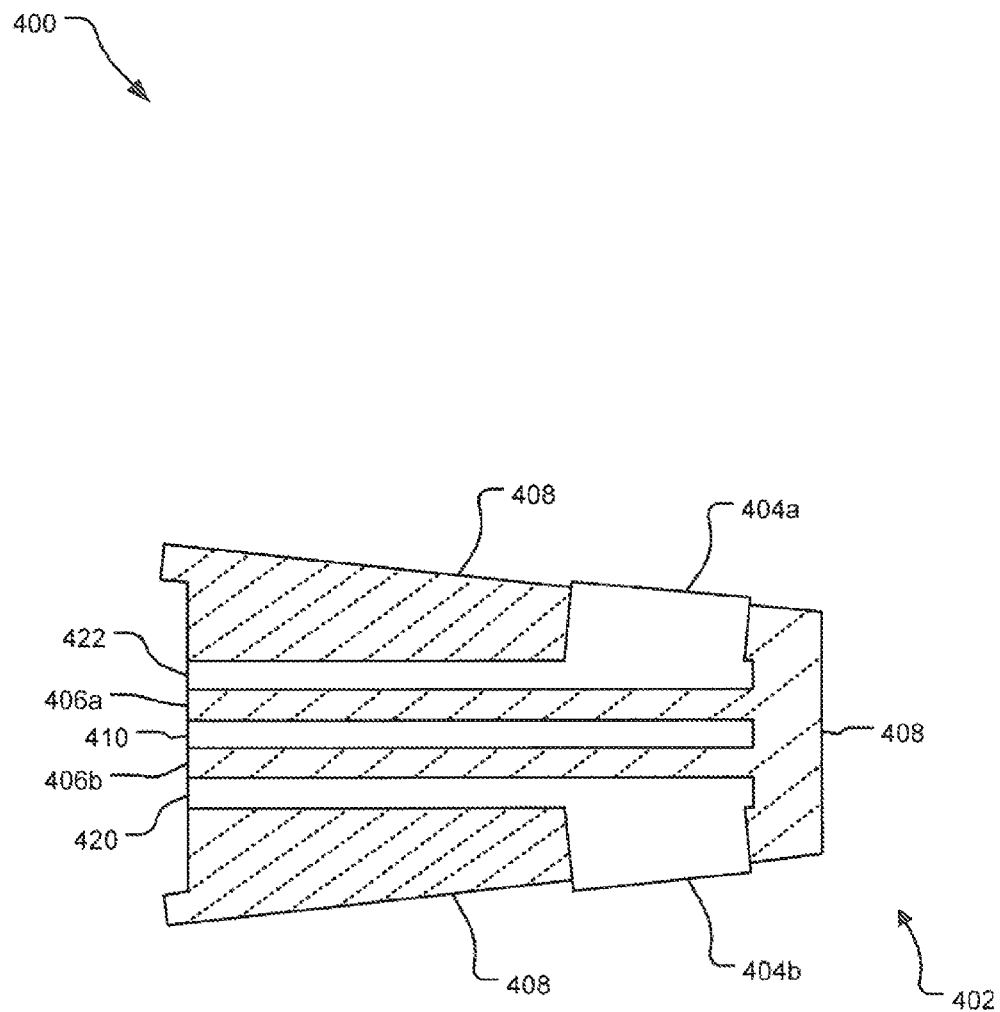

FIG. 4 illustrates a cross-sectional view of electrical connectors embedded in an electro-mechanical locking mechanism disclosed herein.

Figure 5:
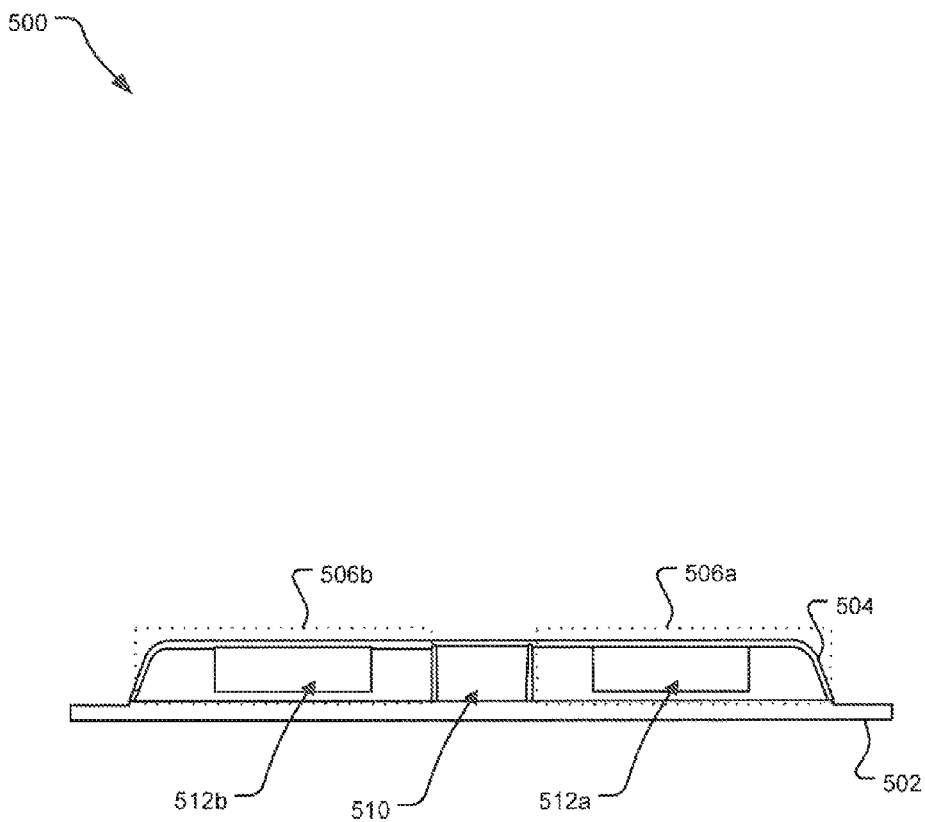

FIG. 5 discloses an illustration of a connector protrusion for the electro-mechanical locking mechanism disclosed herein.

Figure 6:
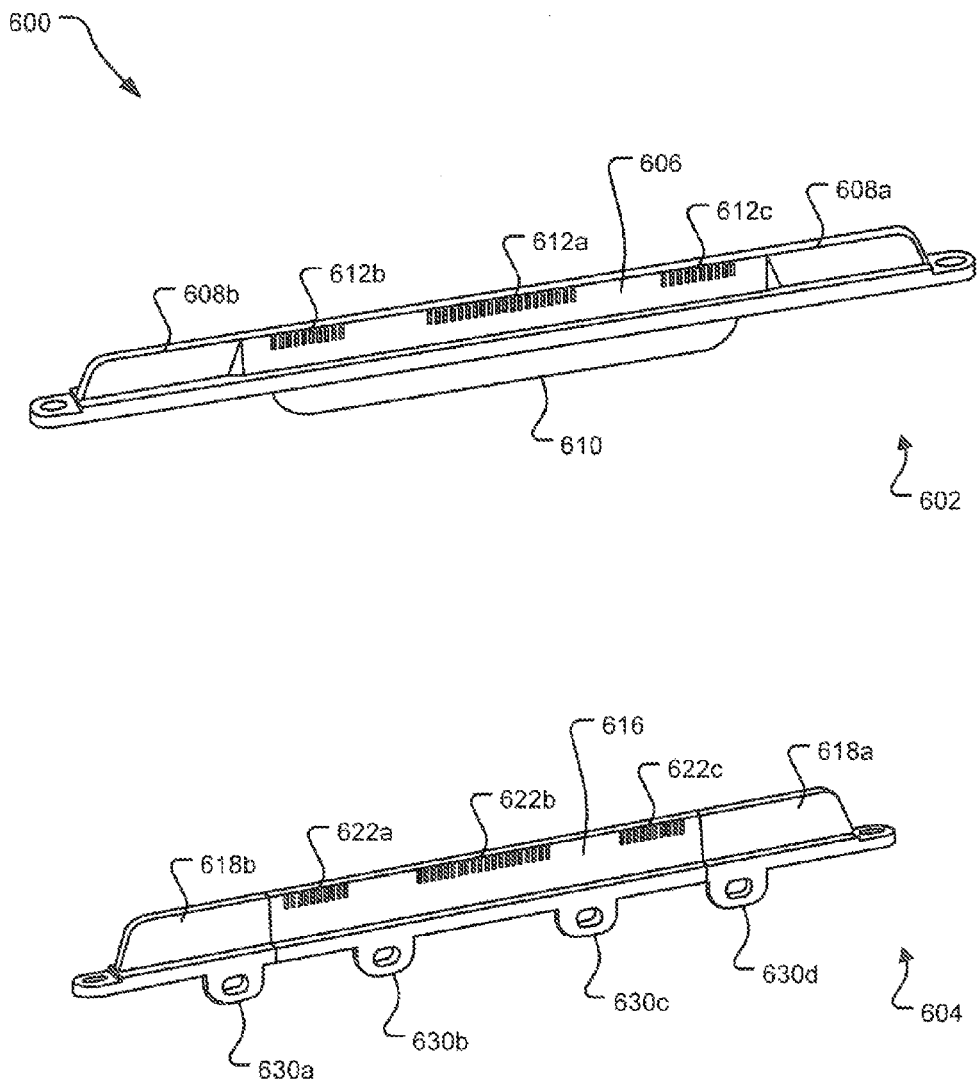

FIG. 6 illustrates alternative example views of the connector protrusion of the electro-mechanical locking mechanism disclosed herein.

Figure 7:
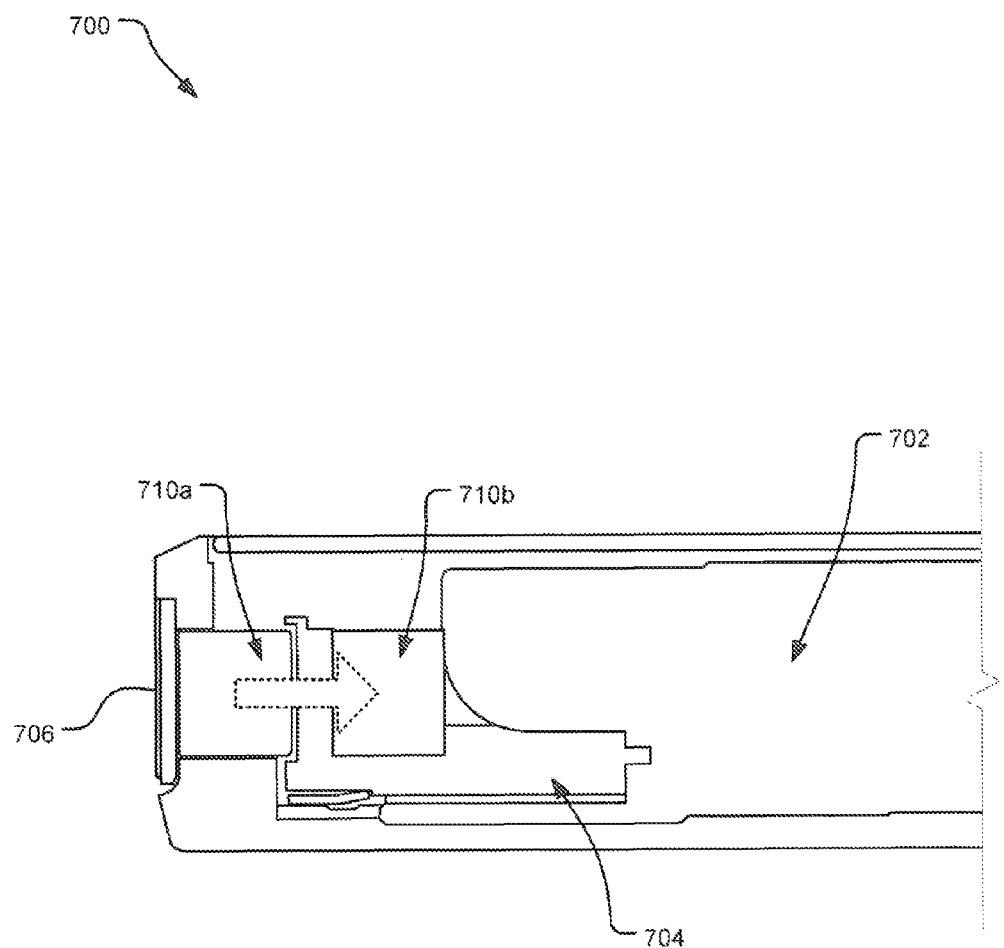

FIG. 7 illustrates an example partial side view of a receiving component using the electro-mechanical locking mechanism disclosed herein.

Figure 8:
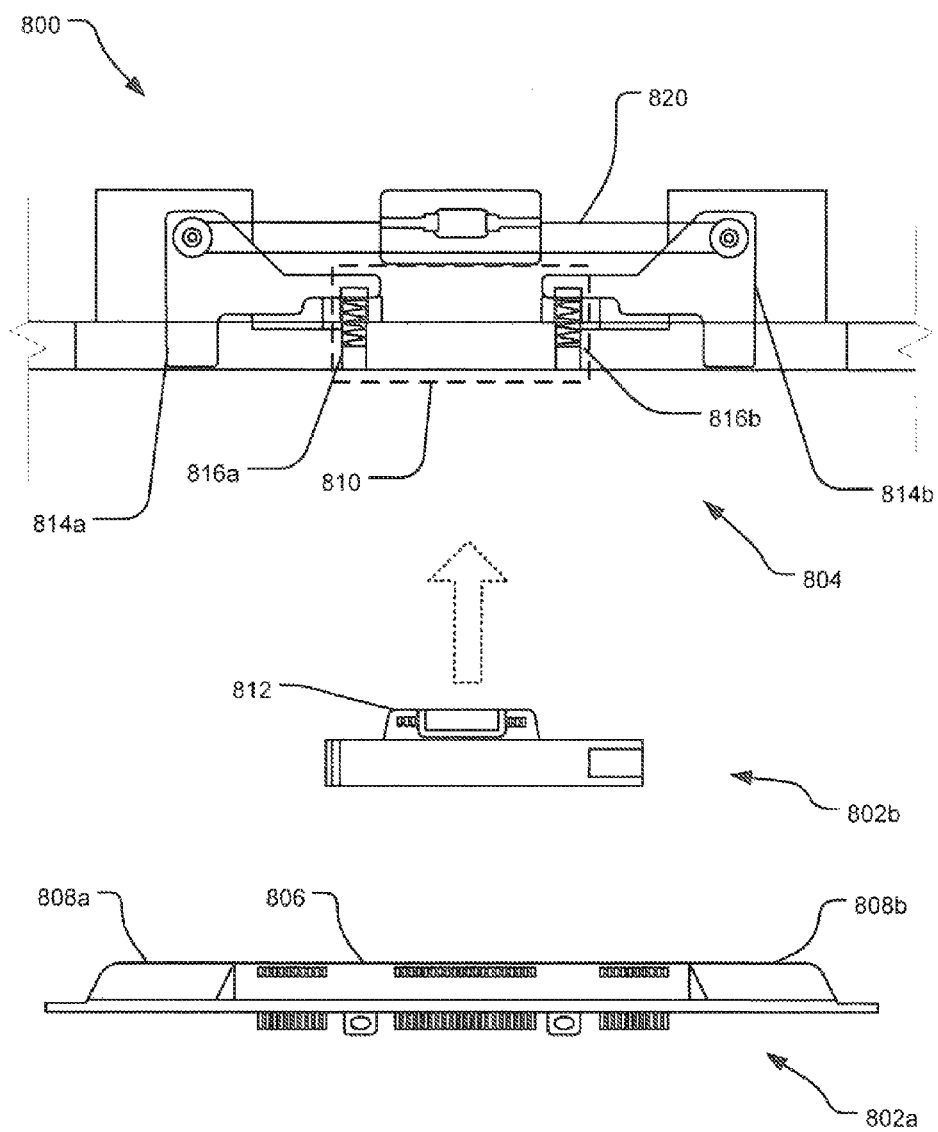

FIG. 8 illustrates an example partial back view of an electro-mechanical locking mechanism disclosed herein.

Figure 9:
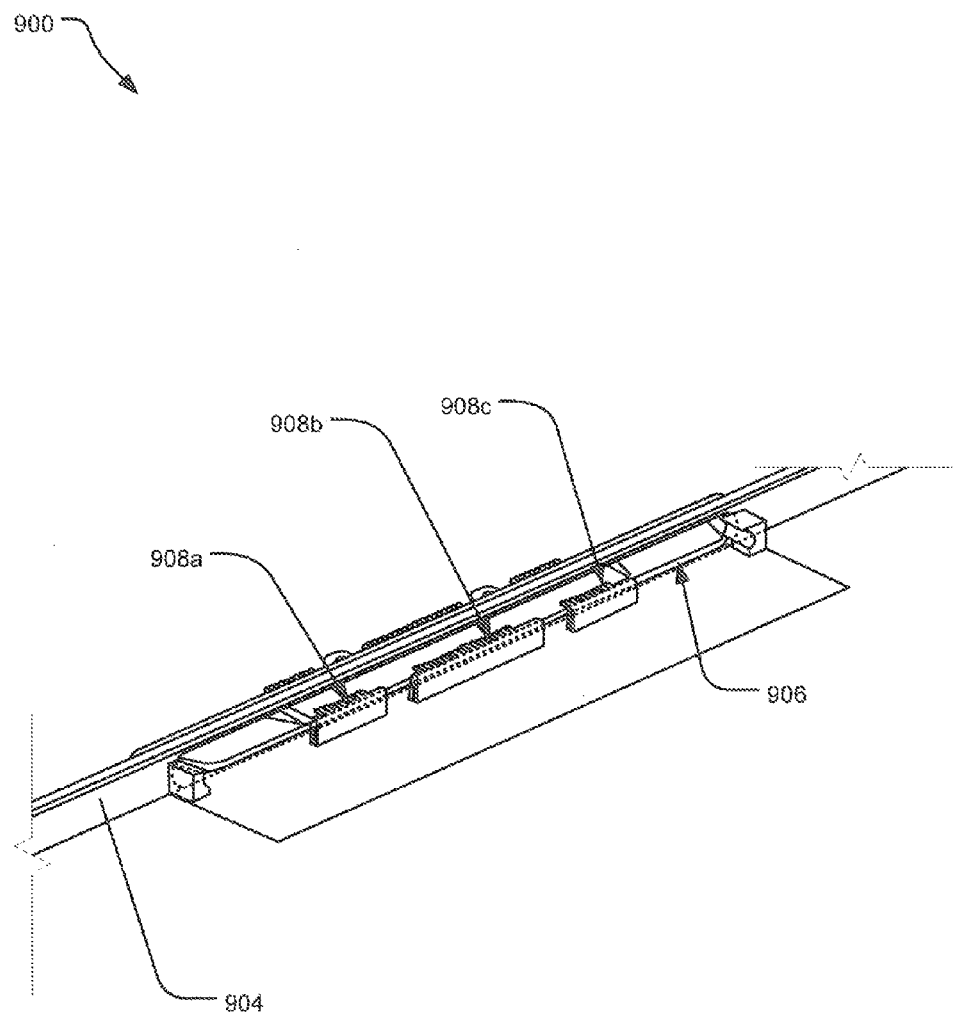

FIG. 9 illustrates an example implementation of a receptacle of the electro-mechanical locking mechanism disclosed herein.

Figure 10:
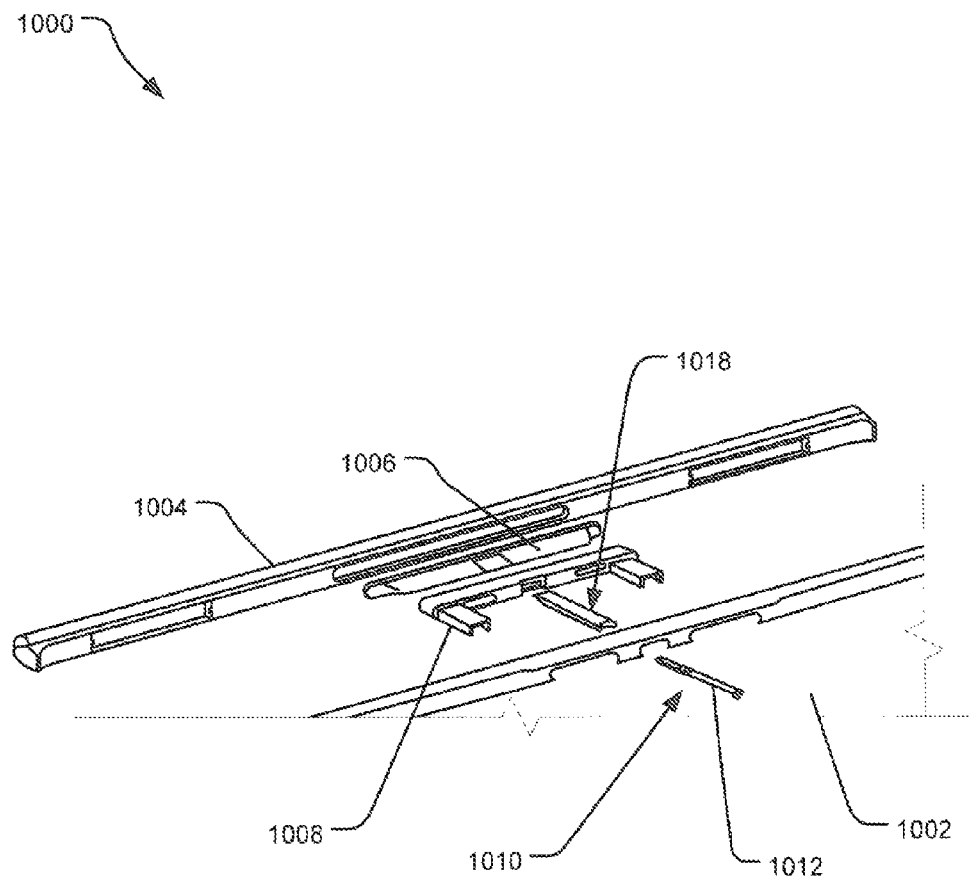

FIG. 10 illustrates an alternative view of an electro-mechanical locking mechanism with one actuator for single lock.

Figure 11:
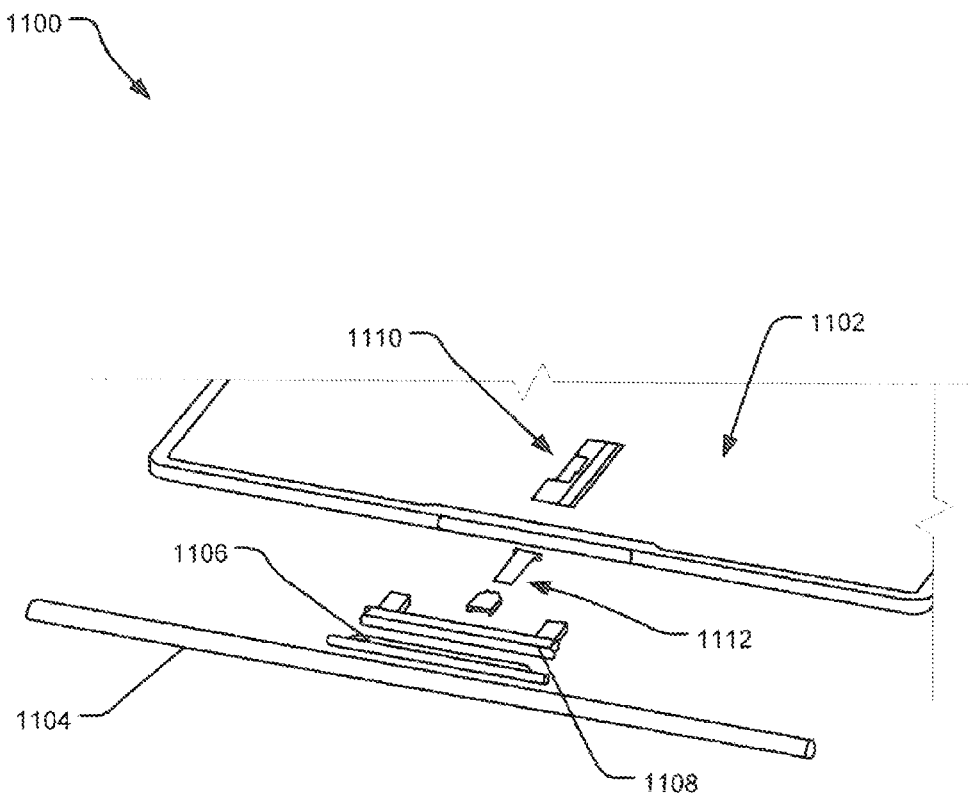

FIG. 11 illustrates yet another alternative view of an electro-mechanical locking mechanism with one actuator for single lock.

Figure 12:
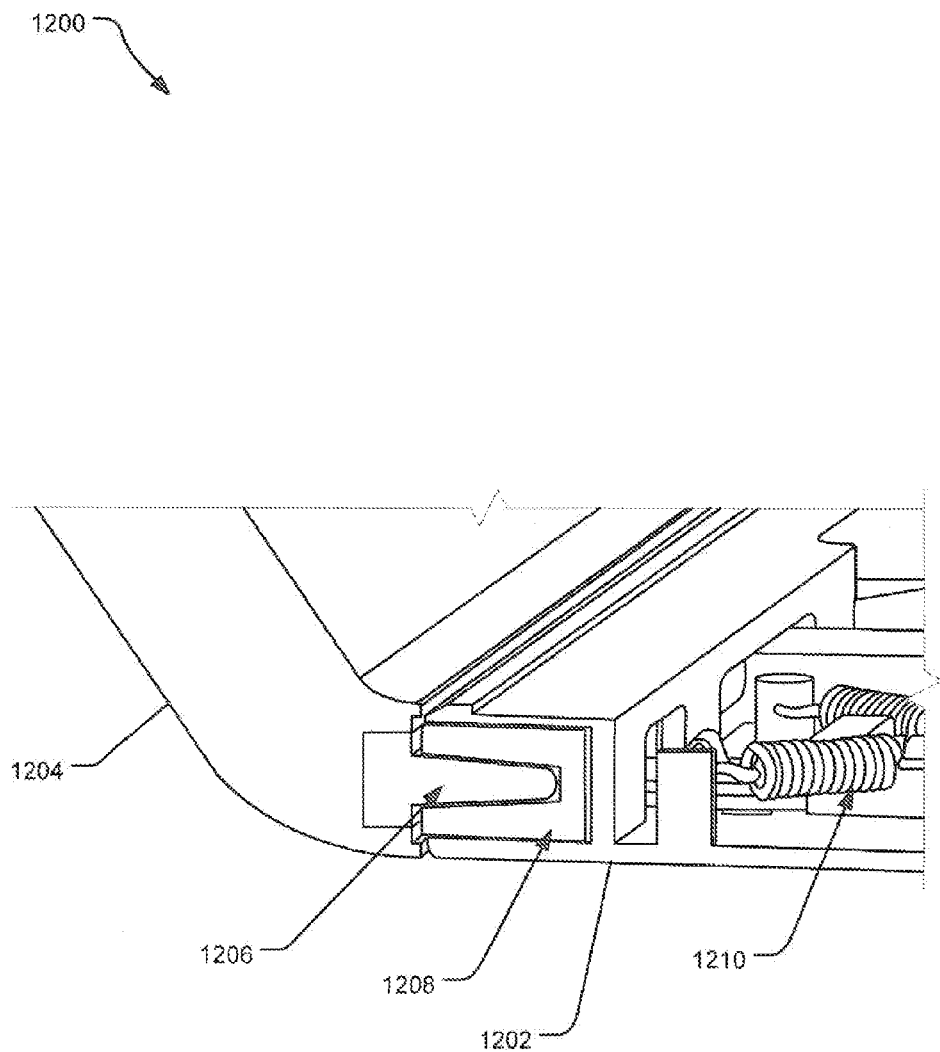

FIG. 12 illustrates an alternative view of the electro-mechanical locking mechanism disclosed herein.

DETAILED DESCRIPTIONS

The technology disclosed herein includes a connecting apparatus for a computing device including a connector protrusion attached to an input component and a receptor formed in a receiving component of the computing device and configured to attach to the connector protrusion. The connector protrusion includes a center section having a plurality of electrical connectors configured within a plastic overmold and configured to be communicatively coupled to the computing device to communicate the generated signals and two end sections having mechanical support components configured to be physically coupled to the computing device wherein each of the two end sections are contiguous to the center section. The receptor includes a locking mechanism configured to releasably attach to the connector protrusion. The mechanical support components also provide support to the receiving component. For example, such receiving component may be a display component that is attached to the input component such as it may be able to swivel and incline. In such a case, the connector protrusion supports the load and weight moment of the input component when the input component is in an inclined state.

Figure 1:
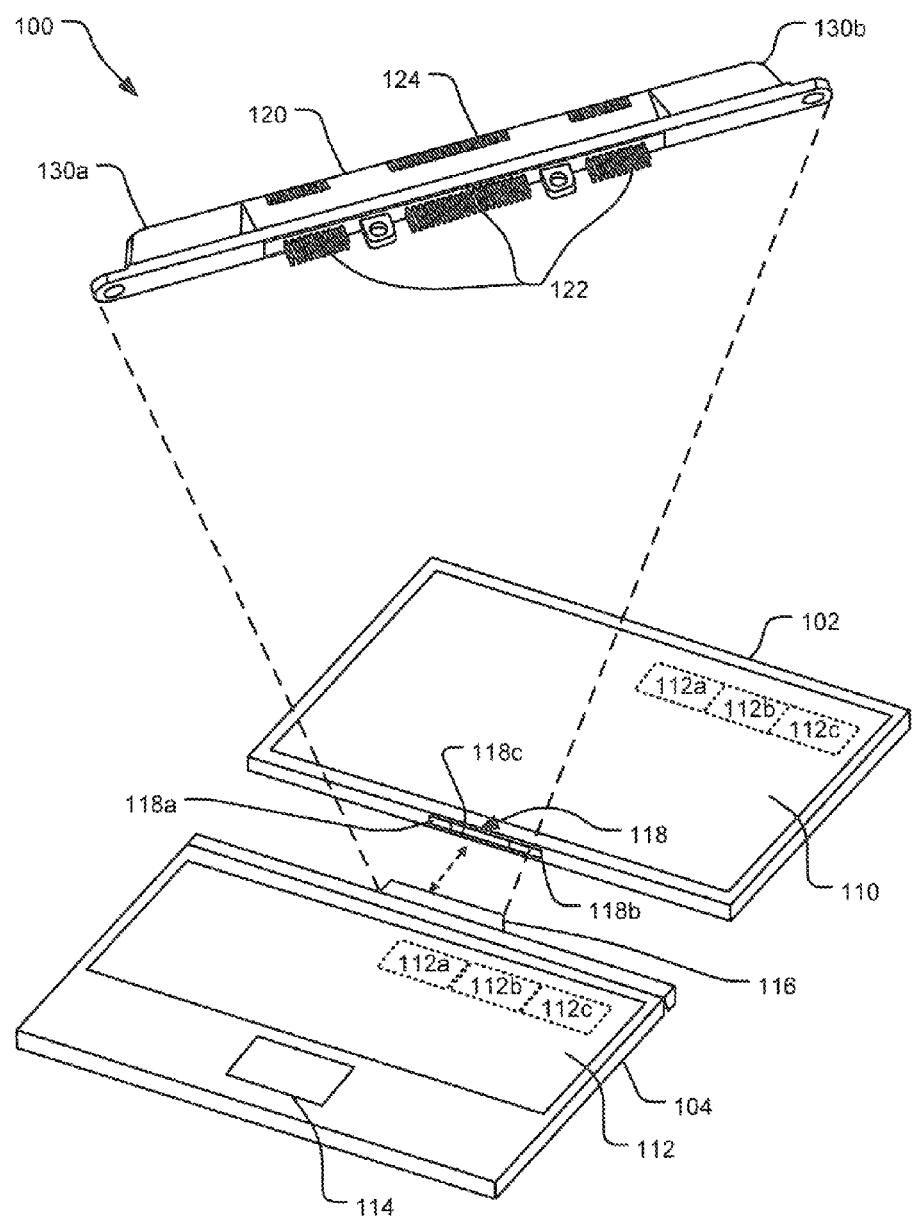
FIG. 1 illustrates an example computing device including two components and an electro-mechanical locking mechanism for connecting the two components.

FIG. 1 illustrates an example computing device 100 including two components and an electro-mechanical locking mechanism for connecting the two components. The computing device 100 may include an input component 104 and a receiving component 102. The input component 104 mat include one or more input components such as a keyboard 112, a mousepad 114. The receiving component 102 may include an output component such as a display screen 110 that displays output to a user. The display screen 110 may also act as an input module where a user may input information using touch-screen, stylus, finger. For example, the keyboard 112 may also be virtually displayed on the display screen 110. In such an implementation, one or more of the input keys 112a, 112b, 112c, of the keyboard 112 may also be virtually displayed on the display screen 110.

The input component 104 may be physically and/or communicatively attached to the receiving component 102. In one implementation, the input component 104 may be attached to a connector protrusion 116 that is used to physically and/or communicatively connect the input component 104 with the receiving component 102. The connector protrusion 116 may include a center section 120 having several electrical connectors 122 and two end sections 130a and 130b. The center section 120 may be formed using a combination of a shell (such as the shell 212 disclosed in FIG. 2) and an electrical connector (such as the electrical connector 210 disclosed in FIG. 2). Specifically, the shell may include various openings 124 configured on the top edge of the connector protrusion 116 and one or more of these openings 124 are configured to mate with one of the connector pins on the electrical connector. The receiving component 102 may include a receptor 118 for attaching to the connector protrusion 116.

Each of the side sections 130a and 130b are substantially contiguous with the center section 120. In one implementation, each of the side sections 130a and 130b are made of ceramic material. In one implementation, the shell (such as the shell 212 disclosed in FIG. 2) of the center section 120 may also be made of ceramic material. Alternatively, the each of the side section 130a and 130b may be made of a metal using metal injection molding (MIM). In such an implementation, the center section 120 may still be made of a ceramic using ceramic injection molding. Making the center section 120 of ceramic provides electrical isolation. The side sections 130a and 130b provide mechanical support to the receiving component 102 when the receiving component 102 is attached to the input component 104. Specifically, the receiving component 102 may be attached to the input component 104 by inserting the connector protrusion 116 in the receptor 118. The receptor 118 may include two end openings 118a, 118b at two ends of the receptor 118 such that the end openings 118a and 118b mate with the end sections 130a and 130b of the connector protrusion 116. A center opening 118c of the receptor 118 may be configured to mate with the center section 120 of the connector protrusion 116.

Figure 2:
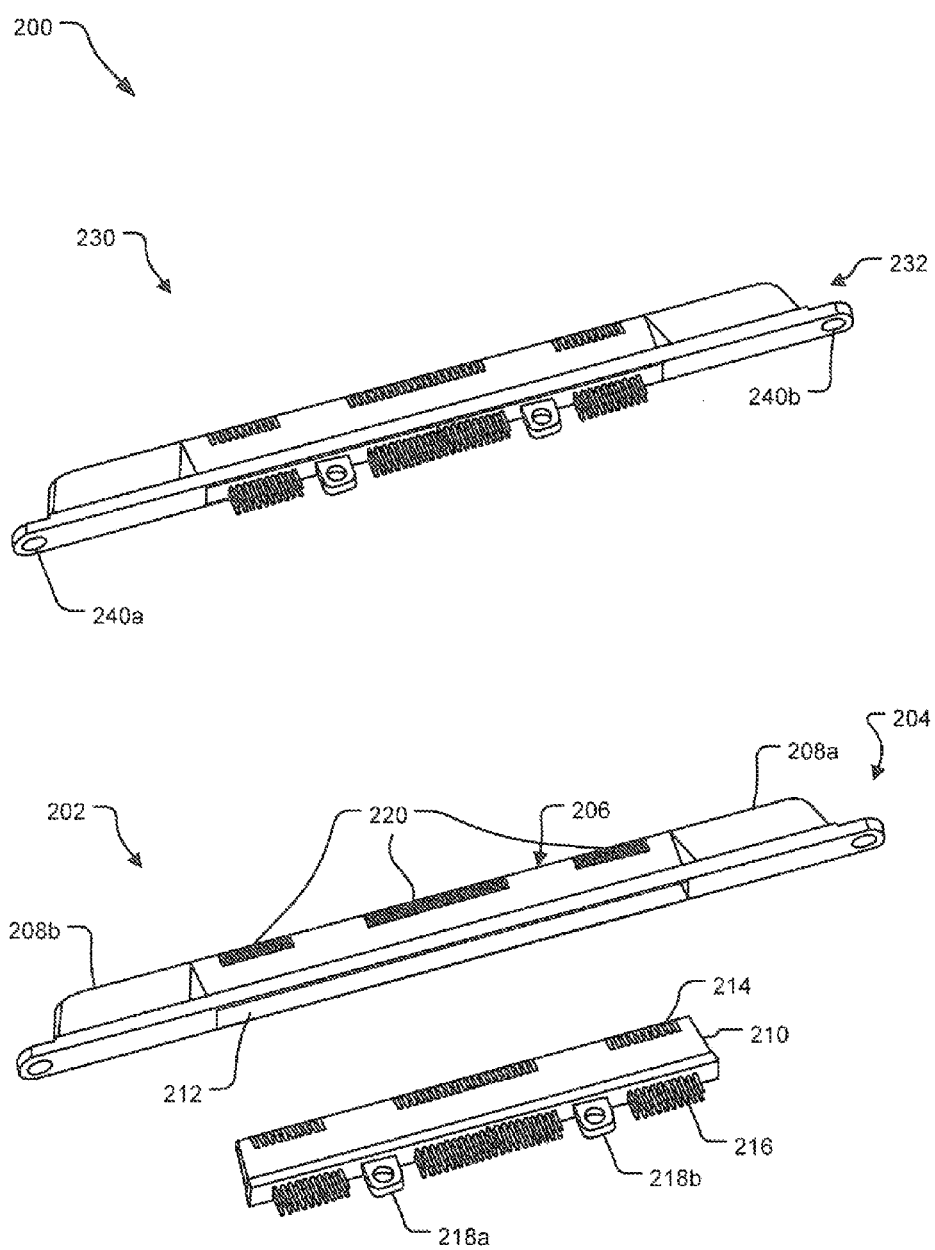
FIG. 2 illustrates an example illustrations of a connector protrusion of the electro-mechanical locking mechanism for connecting the two components of a computing device.

FIG. 2 illustrates an example illustrations 200 of a connector protrusion of the electro-mechanical locking mechanism for connecting the two components of a computing device. Specifically, an illustration 202 discloses a connector protrusion 204 and an electrical connector 210 dis-assembled from the connector protrusion 204. The connector protrusion 204 includes a center section 206 and two end sections 208a and 208b. The center section 206 may include serrated electrical openings 220. In one implementation, the center section 206 includes a total of eighty (80) serrated electrical openings 220 to provide capability for eighty (80) electrical connectors. However, in an alternative implementation, a different number of serrated electrical openings 220 may be provided.

The connector protrusion 204 also includes two end sections 208a and 208b. In one implementation, the center section 206 and the two end sections 208a, 208b are contiguous with each other. The center section 206 and the two end sections 208a, 208b may be made of ceramic material. Specifically, providing the center section 206 and the two end sections 208a, 208b made of ceramic material provides mechanical stability to the connector protrusion 204. In an alternative implementation, the center section 206 and the two end sections 208a, 208b may be made of a metal using MIM process. The end sections 208a and 208b are used to provide mechanical support when the connector protrusion 204 is mated with a receptor of a receiving component of a computing device. Such a receptor may be configured to lock onto the end sections 208a and 208b. Having the center section 206 made of same material and being contiguous to the end sections 208a and 208b adds to the mechanical support provided by the connector protrusion.

The electrical connector 210 includes a plurality of electrical pins 216 that may be configured to connect to one or more electrical terminals located on a circuit board of a computing device. Furthermore, the electrical connector 210 may be secured with such circuit board of the computing device using attachment mechanisms 218a and 218b. The electrical pins 216 may be electrically connected to various electrical contacts 214. The electrical contacts 214 may be configured to connect with electrical contacts within a receptor of the computing device.

In one implementation, the electrical connector 210 is formed using plastic overmolding mechanism. Specifically, the electrical connector 210 may be formed to have plastic overmold over the electrical pins 216 and further include plastic insulators (such as the insulators 406a and 406b disclosed in FIG. 4). The electrical connector 210 may be inserted into the shell 212 of the connector protrusion 204 such that the electrical contacts 214 are physically and electrically accessible through the serrated electrical openings 220. In one implementation, the electrical connector 210 includes eighty (80) electrical pins 216. However, in an alternative implementation, a different number of electrical pins 216 may be provided.

An illustration 230 discloses a connector protrusion 232 in an assembled form including the connector protrusion 204 and the electrical connector 210. The connector protrusion 232 also includes openings 240a and 240b that may be used to physically attach the connector protrusion 232 to a computing device.

FIG. 3 discloses alternative illustrations 300 of the electro-mechanical locking mechanism disclosed herein. Specifically, an illustration 302 discloses a connector protrusion 304 including a center section 306 and two end sections 308a and 308b. The center section 306 may be formed to have as solid plastic molded around metal contacts 314. In one implementation, the center section 306 is made using overmolding process. Specifically, the center section 306 includes various metal contacts 314 formed in a plastic overmold. Each of the two end sections 308a and 308b may be made of metal and formed using MIM process. In one implementation, each of the end sections 308a and 308b may be made of metal and include dovetail features 310a and 310b to hold the center section 306.

FIG. 3 also discloses an alternative illustration of a connector protrusion 352. Specifically, the connector protrusion 352 includes various attachment mechanisms 320a-320d, 330a, and 330b for physically attaching the connector protrusion 352 to a computing device. The end section 308a and 308b may also be used as locking surfaces to lock the connector protrusion 302 to a receiving component of the computing device.

FIG. 4 illustrates a cross-sectional view 400 of electrical connectors embedded in an electro-mechanical locking mechanism disclosed herein. Specifically, the cross-sectional view 400 illustrates a cross-section of a top portion 402 of an electrical connector (such as the electrical connector 210 disclosed in FIG. 2). In one implementation, such electrical connector may be made from plastic overmolding process. The top portion 402 includes electrical connectors 420 and 422 that may connect to various electrical terminals on a printed circuit board of a computing device. Electrical connectors 420 and 422 are exposed as electrical contacts 404a and 404b on two opposite sides of the top portion 402.

A ground plane 410 may be formed between the electrical connectors 420 and 422. In one implementation, the electrical connectors 420 and 422 and the ground plane 410 are formed within plastic overmold 408. Thus, at least a part of the plastic overmold 408 is formed at the tip of the top portion 402. Also, at least part of the plastic overmold 408 also forms insulators 406a and 406b between the electrical connectors 420 and 422 and the ground plane 410.

FIG. 5 discloses an illustration of a connector protrusion 500 for the electro-mechanical locking mechanism disclosed herein. Specifically, the connector protrusion 500 is formed including a single locking surface 510 at the center of the connector protrusion 500. The locking surface 510 may be made of ceramic, metal, or other material that provides mechanical stability to the connector protrusion 500 when it is used to connect two components of a computing device. Two side sections 506a and 506b are formed of plastic using overmolding process. Each of the side sections 506a and 506b includes electrical contacts 512a and 512b. In one implementation, each of the electrical contacts 512a and 512b provides forty (40) electrical contacts.

A bottom surface 502 of the connector protrusion 500 may be physically attached to one component of a computing device, whereas the top portion 504 may be inserted into a second component of the computing device to physically and communicatively connect the two components of the computing device.

FIG. 6 illustrates alternative example views of the connector protrusion 600 of the electro-mechanical locking mechanism disclosed herein. Specifically, a connector protrusion 602 includes a center section 606 and two end sections 608a and 608b configured such that the center section 606 and the two end sections 608a and 608b are contiguous to each other. In one implementation, the end sections 608a and 608b may be made of rigid material, such as ceramic or metal, to provide mechanical stability. The center section 606 may include several electrical contacts 612a, 612b, and 612c formed within over-molded plastic. An electrical connector 610 (such as the electrical connector 210 of FIG. 2) may be used to electrically connect the electrical contacts 612a, 612b, and 612c with various electrical terminals on a circuit board of a computing device.

A connector protrusion 604 includes a center section 616 and two end sections 618a and 608b configured such that the center section 616 and the two end sections 618a and 618b are contiguous to each other. In one implementation, the end sections 618a and 618b may be made of rigid material, such as ceramic or metal, to provide mechanical stability. The center section 616 may include several electrical contacts 622a, 622b, and 622c formed within over-molded plastic. Various attachment mechanisms 630a, 630b, 630c, and 630d may be used to attach the connector protrusion 604 with a component of a computing device.

FIG. 7 illustrates an example partial side view of a receiving component 700 using the electro-mechanical locking mechanism disclosed herein. Specifically, the receiving component 700 may include a display screen 702 and related circuitry and a connector body 704 disposed within the receiving component 700. The connector body 704 may have one or more electrical terminals that connect with electrical contact of a connector protrusion (such as the connector protrusion 116 disclosed in FIG. 1). In one implementation, a back end of the receiving component 700 may include a receptor 706 (such as the receptor 118 disclosed in FIG. 1) that may receive the connector protrusion.

The receiving component 700 may also include a spring-loaded magnet 710 that is in vicinity of the receptor 706 such that when the connector protrusion is inserted in the receptor 706, the spring-loaded magnet 710 retracts away from the back end, thus moving from a position 710a to 710b. The spring-loaded magnet 710 magnetically attaches part of the connector protrusion with the receiving component 700. Furthermore, the spring mechanism of the spring-loaded magnet 710 may be activated by passing current through a wire that is made of a material that is configured to undergo deformation in response to passing of current there-through (such as the wire 820 disclosed in FIG. 8).

FIG. 8 illustrates an example partial back view of an electro-mechanical locking mechanism 800 disclosed herein. Specifically, the electro-mechanical locking mechanism 800 includes two connector protrusions 802a and 802b and a receiving component 804. Note that while FIG. 8 illustrates two different connector protrusions 802a and 802b and only one receiving component 804, it is to be understood that only one of the two connector protrusions 802a and 802b attaches with the receiving component 804 at any time. However, FIG. 8 illustrates that the configuration of the electro-mechanical locking mechanism 800, as disclosed herein, provides compatibility for two different types of connector protrusions 802a and 802b.

The connector protrusion 802a may be substantially similar to one of the various connector protrusions disclosed herein (such as the connector protrusion 204 disclosed in FIG. 2, the connector protrusion 304 disclosed in FIG. 3, the connector protrusion 500 disclosed in FIG. 5, and connector protrusions 602 and 604 disclosed in FIG. 6). The connector protrusion 802a may include a center section 806 with a number of electrical contacts and two end sections 808a and 808b, wherein each one of the end sections 808a and 808b are made of a substantially rigid material such as ceramic or metal, to provide mechanical support to the receiving component 804 when the receiving component 804 is connected to the connector protrusion 802a.

The connector protrusion 802b provides an alternative structure with only electrical connections on a center portion 812. However, the connector protrusion 802b does not include any end sections in a manner included in the connector protrusion 802a. In such an implementation, the mechanical support elements may be provided in another section of the computing device. The receiving component 804 includes a receptor 810 that receives one of the connector protrusions 802a or 802b. The receiving component 804 may also include spring mechanisms 816a and 816b that are attached to locking mechanisms 814a and 814b and a wire 820 that is made of a material configured to undergo deformation in response to passing of current there-through.

When a current is passed through the wire 820, it deforms. The deformation may result in levers of the locking mechanisms 814a and 814b to be pulled away from the top of the spring mechanisms 816a and 816b resulting in release of the connector protrusion 802a or 802b from the receptor 810. In one implementation, the wire 820 may be made of an alloy of nickel and titanium, also referred to as Nitinol. However, other metal or metal alloys that deform in response to a stimulus may also be used.

FIG. 9 illustrates an example implementation of a receptacle 900 of the electro-mechanical locking mechanism disclosed herein. The receptacle 900 may be formed with an opening in a bottom wall 904 of a receiving component of a computing device. For example, such receiving component may house a display screen or other components of the computing device. A connector protrusion 906 having multiple electrical contact points 908a, 908b, and 908c is shown as inserted in the receptacle 900.

FIG. 10 illustrates an alternative view of an electro-mechanical locking mechanism 1000 with one actuator for single lock. Specifically, the implementation disclosed in FIG. 10 illustrates a receiving component 1002, such as one used to house a display screen and various components that are housed within the receiving component 1002. A bottom edge 1004 of an input component is attached to a connector protrusion 1006 that is removably attached to a receptacle 1008 that is configured to be attached to the receiving component 1002. A locking mechanism, such as a roller-lock (or a wedge-lock) 1010, including a Nitinol wire 1012, may be used to unlock the connector protrusion 1006 from the receptacle 1008. When in a locked position, the roller-lock 1010 may lock the receiving component 1002 to the bottom edge 1004 of an input component using a latch 1018.

FIG. 11 illustrates an alternative view of an electro-mechanical locking mechanism 1100 with one actuator for single lock. Specifically, the implementation disclosed in FIG. 11 illustrates a receiving component 1102, such as one used to house a display screen and various components that are housed within the receiving component 1102. A bottom edge 1104 of an input component is attached to a connector protrusion 1106 that is removably attached to a receptacle 1108 that is configured to be attached to the receiving component 1102. An electro-mechanical linear actuator 1110, including a Nitinol wire (or other linear actuator), may be used to unlock the connector protrusion 1106 from the receptacle 1108. A roller-lock (or wedge-lock) 1112 may be used to unlock the connector protrusion 1106 from the receptacle 1108.

FIG. 12 illustrates an alternative view of the electro-mechanical locking mechanism 1200 disclosed herein. Specifically, the implementation disclosed in FIG. 12 illustrates a receiving component 1202, such as one used to house a display screen and various components that are housed within the receiving component 1202. A bottom edge of an input component 1204 is attached to a connector protrusion 1206 that is removably attached to a receptacle 1208 that is configured to be attached to the receiving component 1202. A spring lock mechanism 1210, including a Nitinol wire may be used to unlock the connector protrusion 1206 from the receptacle 1208. Specifically, the spring mechanism 1210 may be activated by a wire that deforms when a current is passed there-through.

An input component of a computing device includes an input module configured to generate signals to be processed by the computing device and a connector protrusion attached to the input component. The connector protrusion includes a center section having a plurality of electrical connectors configured within a plastic overmold and configured to be communicatively coupled to the computing device to communicate the generated signals, and two end sections having mechanical support components configured to be physically coupled to the computing device wherein each of the two end sections are contiguous to the center section. In one implementation, the center section further includes a shell for receiving an electrical connector having a plurality of connector pins and a plurality of openings, each of the plurality of openings configured to mate with one of the plurality of connector pins.

In an alternative implementation, each of the two end sections is made of ceramic material. In another implementation, each of the two end sections is made of steel. Alternatively, each of the two end sections is made with metal injection molding (MIM). In one implementation, the center section is configured to be within a MIM shell. The MIM shell of the center section may be contiguous with MIM material of each of the two end sections. Alternatively, the center section may be configured to be within a ceramic shell. Yet alternatively, the ceramic shell of the center section is contiguous with ceramic material of each of the two end sections.

A connecting apparatus for a computing device is disclosed herein. The connecting apparatus for a computing device includes a connector protrusion attached to an input component and a receptor formed in a receiving component of the computing device and configured to attach to the connector protrusion. The receptor may include a locking mechanism (wedge-lock or a roller-lock) configured to releasably attach to the connector protrusion and a spring lock mechanism attached to the locking mechanism, wherein the spring lock mechanism is configured to pull the locking mechanism away from the connector protrusion in response to receiving current.

In one implementation, the spring lock mechanism further comprising a memory alloy wire configured to undergo deformation and attached on one end with a circuit receiving a current and attached on another end with the locking mechanism. In one implementation, the memory alloy wire is an alloy of Nickel and Titanium. In another implementation, the spring lock mechanism further comprising a linear actuator attached on one end with a circuit receiving a current and attached on another end with the locking mechanism.

Alternatively, the connector protrusion also includes a center section having a plurality of electrical connectors configured within a plastic overmold and configured to be communicatively coupled to the computing device to communicate the generated signals and two end sections having mechanical support components configured to be physically coupled to the computing device wherein each of the two end sections are contiguous to the center section. In one implementation, the locking mechanism further comprises a plurality of electrical receivers configured to communicatively connect with the plurality of electrical connectors of the protrusion section. Alternatively, each of the two end sections having a locking surface configured to attach with the locking mechanism of the receptor.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A computing device, comprising:
    an input module configured to generate signals to be processed by the computing device;
    a connector protrusion attached to the input component, the connector protrusion including:
        a center section having a plurality of electrical connectors configured within a plastic overmold and configured to be communicatively coupled to the computing device to communicate the generated signals, and
        two end sections having mechanical support components configured to be physically coupled to the computing device wherein each of the two end sections are contiguous to the center section; and
    a receptor formed in a receiving component of the computing device and configured to attach to the connector protrusion, the receptor comprising a spring lock mechanism attached to a locking mechanism, wherein the spring lock mechanism is configured to pull the locking mechanism away from the connector protrusion in response to receiving current.

2. The computing device of claim 1, wherein the center section further comprising:
    a shell for receiving an electrical connector having a plurality of electrical pins; and a plurality of openings, each of the plurality of electrical openings configured to mate with one of the plurality of electrical pins.

3. The computing device of claim 2, wherein each of the two end sections is made of ceramic material.

4. The computing device of claim 2, wherein each of the two end sections is made of steel.

5. The computing device of claim 4 wherein each of the two end sections is made with metal injection molding (MIM).

6. The computing device of claim 5, wherein the center section is configured to be within a MIM shell.

7. The computing device of claim 6, wherein the MIM shell of the center section is contiguous with MIM material of each of the two end sections.

8. The computing device of claim 2, wherein the center section is configured to be within a ceramic shell.

9. The computing device of claim 8, wherein the ceramic shell of the center section is contiguous with ceramic material of each of the two end sections.

10. A connecting apparatus for a computing device, comprising:
a connector protrusion attached to an input component; and
a receptor formed in a receiving component of the computing device and configured to attach to the connector protrusion, the receptor comprising:
a locking mechanism configured to releasably attach to the connector protrusion,
a spring lock mechanism attached to the locking mechanism, wherein the spring lock mechanism is configured to pull the locking mechanism away from the connector protrusion in response to receiving current.

11. The connecting apparatus of claim 10, wherein the spring lock mechanism further comprising a memory alloy wire configured to undergo deformation and attached on one end with a circuit receiving a current and attached on another end with the locking mechanism.

12. The connecting apparatus of claim 11, wherein the memory alloy wire is an alloy of Nickel and Titanium.

13. The connecting apparatus of claim 10, wherein the spring lock mechanism further comprising a linear actuator attached on one end with a circuit receiving a current and attached on another end with the locking mechanism.

14. The connecting apparatus of claim 10, wherein the connector protrusion further comprising:
a center section having a plurality of electrical connectors configured within a plastic overmold and configured to be communicatively coupled to the computing device to communicate generated signals; and
two end sections having mechanical support components configured to be physically coupled to the computing device wherein each of the two end sections are contiguous to the center section.

15. The connecting apparatus of claim 14, wherein an attachment mechanism further comprises a plurality of electrical receivers configured to communicatively connect with the plurality of electrical connectors of a protrusion section.

16. The connecting apparatus of claim 14, wherein each of the two end sections having a locking surface configured to attach with the locking mechanism of the receptor.

17. A connecting apparatus for a computing device, comprising:
a connector protrusion attached to an input component; and
a receptor formed in a receiving component of the computing device and configured to attach to the connector protrusion,
wherein the receptor comprising a locking mechanism configured to releasably attach to the connector protrusion; and
wherein the receptor further comprising a spring lock mechanism attached to the locking mechanism, wherein the spring lock mechanism is configured to pull the locking mechanism away from the connector protrusion in response to receiving current.

18. The connecting apparatus of claim 17, wherein the spring lock mechanism further comprising two springs, each of the two springs attached on one end with a circuit receiving a current and attached on another end with the locking mechanism.

19. The connecting apparatus of claim 18, wherein the circuit receiving the current further comprises a wire formed of an alloy of Nickel and Titanium.

* * * * *